UNITED STATES PATENT OFFICE.

AAGE JACK ZIIRSEN, OF BIRMINGHAM, ENGLAND.

CHEMICAL PROCESS OF SHARPENING WORN FILES.

1,161,816.

No Drawing.

Specification of Letters Patent. Patented Nov. 23, 1915.

Application filed April 25, 1912. Serial No. 693,234.

*To all whom it may concern:*

Be it known that I, AAGE JACK ZIIRSEN, engineer, a subject of the King of Denmark, and a resident of Birmingham, England, have invented new and useful Improvements in Chemical Processes of Sharpening Worn Files, of which the following is a specification.

My invention relates to a chemical process of sharpening worn files and making them able to be used again by treating them with acids.

The essential feature of my invention is primarily the employment of a mixture of sulfuric and nitric acids for sharpening the files, a mixture of fuming sulfuric acid (Nordhäuser vitriol) and fuming nitric acid of a definite composition being preferably employed.

A primary object of my invention is to sharpen the files in an exceedingly short time without the files themselves being attacked by the strong acids, and therefore to enable a large quantity of files to be sharpened in a short time.

My invention is carried into practice as follows:—The blunt files are first cleaned from adhering grease and other impurities with a soda solution and then rinsed in cold water. The files are then placed in such manner in an acid-proof vessel, *e. g.*, a water-tight wooden box, that the liquid can flow all around them. To this end, small blocks of wood or the like are preferably placed at suitable distances apart in the vessel on which the files are laid. The mixture for sharpening the files is then put into the vessel in the following manner: First nine parts of water are poured in and then a mixture of one part of fuming sulfuric acid (Nordhäuser vitriol), one part of fuming nitric acid and one part of ordinary commercial sulfuric acid is added. According to the condition and quality of the files in each instance the files are left for about ten to fifteen minutes in this mixture which grows highly hot particularly owing to the fuming and concentrated sulfuric acid meeting with the water. The files are then removed, thoroughly brushed with a wire brush, rinsed in cold water and dried. Lastly, the files are washed with pure petroleum and dried and are then ready for use again and sharp.

In order that good results may be obtained the employment of the above-described mixture is essential because by means of the same the most suitable degree of heat and acidity for a short treatment of the files is obtained.

Having now described my invention what I claim and desire to secure by Letters Patent of the United States is:

The process of sharpening files which consists in placing them in a vessel, pouring water therein and then adding thereto fuming sulfuric and nitric acid and mixing them with said water, thereby heating the bath to a high degree.

In testimony whereof I have hereunto set my hand in presence of two subscribing witnesses.

AAGE JACK ZIIRSEN.

Witnesses:
WOLDEMAR HAUPT,
HENRY HASPER.

Copies of this patent may be obtained for five cents each, by addressing the "Commissioner of Patents, Washington, D. C."